(12) United States Patent
Boyle

(10) Patent No.: US 9,518,219 B2
(45) Date of Patent: Dec. 13, 2016

(54) HYDROTHERMAL SYNTHESIS OF BISMUTH GERMANIUM OXIDE

(71) Applicant: Sandia Corporation, Albuquerque, NM (US)

(72) Inventor: Timothy J. Boyle, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 549 days.

(21) Appl. No.: 14/168,543

(22) Filed: Jan. 30, 2014

(65) Prior Publication Data

US 2015/0210560 A1 Jul. 30, 2015

(51) Int. Cl.
| | |
|---|---|
| *C01G 29/00* | (2006.01) |
| *C09K 11/77* | (2006.01) |
| *G21K 4/00* | (2006.01) |

(52) U.S. Cl.
CPC .......... *C09K 11/7707* (2013.01); *C01G 29/00* (2013.01); *G21K 4/00* (2013.01); *C01P 2002/54* (2013.01); *C01P 2002/72* (2013.01); *C01P 2002/77* (2013.01); *C01P 2002/88* (2013.01); *C01P 2004/02* (2013.01); *C01P 2004/03* (2013.01); *C01P 2004/20* (2013.01); *C01P 2004/42* (2013.01); *C01P 2004/61* (2013.01); *C01P 2006/60* (2013.01)

(58) Field of Classification Search
CPC ...... C09K 11/7707; C01G 29/006; G21K 4/00
USPC ................. 423/594.7; 252/301.4 F
See application file for complete search history.

(56) References Cited

U.S. PATENT DOCUMENTS

| | | | | |
|---|---|---|---|---|
| 4,650,659 A | * | 3/1987 | Henry | .................... C01G 29/00 423/594.7 |
| 6,972,896 B2 | * | 12/2005 | Feillens | .............. H01S 3/06754 359/341.5 |

FOREIGN PATENT DOCUMENTS

WO 2006/007598 * 1/2006

OTHER PUBLICATIONS

Zyryanov, V.V. et al., "Mechanochemical Synthesis of Crystalline Compounds in the Bi2O3—GeO2 System", Inorganic Materials, 2005, pp. 711-719, vol. 41, No. 6.
Novoselov, I.I. et al., "Synthesis of a Bismuth Germanium Oxide Source Material for Bi4Ge3O12 Crystal Growth", Inorganic Materials, 2013, pp. 412-415, vol. 49, No. 4.
Polosan, S. et al., "Synthesis of Eu-doped bismuth germanate nano-ceramic powder", Optoelectronics and Advanced Materials—Rapid Communications, Oct. 2010, pp. 1503-1508, vol. 4, No. 10.
Kozhbakhteeva, D.E. et al., "Hydrothermal Synthesis and Morphology of Eulytite-Like Single Crystals", Journal of Optoelectronics and Advanced Materials, Sep. 2003, pp. 621-625, vol. 5, No. 3.
Chen, R. et al., "Orthorhombic Bi2GeO5 Nanobelts: Synthesis, Characterization, and Photocatalytic Properties", Crystal Growth and Design, 2009, pp. 1775-1779, vol. 9, No. 4.

* cited by examiner

*Primary Examiner* — Steven Bos
(74) *Attorney, Agent, or Firm* — Kevin W. Bieg

(57) ABSTRACT

A method for the hydrothermal synthesis of bismuth germanium oxide comprises dissolving a bismuth precursor (e.g., bismuth nitrate pentahydrate) and a germanium precursor (e.g., germanium dioxide) in water and heating the aqueous solution to an elevated reaction temperature for a length of time sufficient to produce the eulytite phase of bismuth germanium oxide (E-BGO) with high yield. The E-BGO produced can be used as a scintillator material. For example, the air stability and radioluminescence response suggest that the E-BGO can be employed for medical applications.

15 Claims, 15 Drawing Sheets

HYDROTHERMAL SYNTHESIS OF BISMUTH GERMANIUM OXIDE

STATEMENT OF GOVERNMENT INTEREST

This invention was made with Government support under contract no. DE-AC04-94AL85000 awarded by the U. S. Department of Energy to Sandia Corporation. The Government has certain rights in the invention.

FIELD OF THE INVENTION

The present invention relates to scintillator materials and, in particular, to a method for the hydrothermal synthesis of bismuth germanium oxide.

BACKGROUND OF THE INVENTION

Since the first report of bismuth germanium oxide ($Bi_4GeaO_{12}$ or BGO) as a scintillator material in 1973, this material has slowly started to replace the ubiquitous thallium-doped sodium iodide (NaI:Tl) in many of its applications. See W. M. Yen et al., *Phosphor Handbook*, 2$^{nd}$ ed.; CRC Press, Taylor & Francis Group: Boca Raton (2007); and E. Dieguez et al, *J. Phys. C., Solid State Phys.* 18, 4777 (1985). Some of the properties that have led to this substitution include the good stopping power of the high Z numbered Bi, high density (7.112 g/cm$^3$), robust nature (hardness 5 Mho), air stability (non-hygroscopic), radiation hardness (stable to 5.1×10$^4$ Gy), small afterglow (0.005% after 3 ms), rapid rise/decay time (high scintillation efficiency), good energy resolution (5-20 MeV), low self-absorption, photofraction, and a four times larger absorption coefficient. See W. M. Yen et al., *Phosphor Handbook*, 2$^{nd}$ ed.; CRC Press, Taylor & Francis Group: Boca Raton (2007); E. Dieguez et al., *J. Phys. C., Solid State Phys.* 18, 4777 (1985); C. W. E. van Eijk, *Nucl. Instr. Method. Phys. Res. A* 460, 1 (2001); and G. C. Santana et al., *J. Mater. Sci.* 42, 2231 (2007). Even though BGO has only 20% of the light emission of NaI:Tl, the maximum occurs at 480 nm and covers a wide range of wavelengths (375 to 650 nm), which leaves a significant amount of the emission above 500 nm. Although this may not be favorable for scintillation collection by photomultiplier tubes, this broad emission can be effectively collected by new avalanche photodiode arrays. Furthermore, BGO produces ~8500 photons per 1 MeV of high energy radiation that it absorbs. See W. M. Yen et al., *Phosphor Handbook*, 2$^{nd}$ ed.; CRC Press, Taylor & Francis Group: Boca Raton (2007); E. Dieguez et al., *J. Phys. C., Solid State Phys.* 18, 4777 (1985); and C. W. E. van Eijk, *Nucl. Instr. Method. Phys. Res. A* 460, 1 (2001). Combined, these properties make BGO interesting for scintillator applications that require detection of low amounts of γ-emitting material.

While there are numerous phase diagrams reported for BGO, four main phases are reported: sillenite ($Bi_{12}GeO_{20}$), aurivillius ($Bi_2GeO_5$), eulytite ($Bi_4Ge_3O_{12}$), and benitoite ($Bi_2Ge_3O_9$). See V. V. Zyryanov et al., *Inorganic Materials* 41, 618 (2005). Of these, the eulytite (E-BGO) phase is desired for scintillator applications based on its inherent properties. Since BGO has a cubic structure and is optically isotropic, polycrystalline ceramic components will not demonstrate light scattering at the grain boundaries. See W. M. Yen et al., *Phosphor Handbook*, 2$^{nd}$ ed.; CRC Press, Taylor & Francis Group: Boca Raton (2007). Thus, the production of E-BGO polycrystalline materials offers an attractive alternative to the conventional, laborious single crystal BGO scintillators. In addition, the smaller the size of the E-BGO particles, the higher the surface area is expected, which can significantly reduce the sintering temperature and promote the densification process. Combined, these properties can inhibit the formation of oxygen vacancies that can otherwise degrade the optical quality of BGO components. See A. F. Shimanskii and M. N. Vasil'eva, *Refractories and Industrial Ceramics* 42, 20 (2001); and M. G. Kisteneva et al., *Russian Physics Journal* 55, 444 (2012). Further, the synthesis of phase-pure E-BGO powders can replace non-stoichiometric BGO starting powders, thereby leading to higher quality, single crystal optical components and facilitating the fabrication of low cost, high volume BGO ceramic scintillators and/or large size γ-ray detectors. See I. I. Novoselov et al., *Inorganic Materials* 49, 412 (2013).

Several routes have been reported for the production of E-BGO. Typically, these methods follow the established Czochralski process to grow large single crystals of BGO in cube or cylindrical forms. See W. M. Yen et al., *Phosphor Handbook*, 2$^{nd}$ ed.; CRC Press, Taylor & Francis Group: Boca Raton (2007) and E. Dieguez et al., *J. Phys. C., Solid State Phys.* 18, 4777 (1985). Otherwise, synthetic routes to BGO are limited to melts, mechanochemical, and solution routes. See I. I. Novoselov et al., *Inorganic Materials* 49, 412 (2013); M. Ishii and M. Kobayashi, *Prog. Cryst. Growth Charact.* 23, 245 (1991); M. T. Borowiec et al., *Proc. of SPIE* 5136, 26 (2003); G. C. Santana et al., *J. Mater. Sci.* 42, 2231 (2007); V. V. Zyryanov et al., *Inorganic Materials* 41, 618 (2005); Z. S. Macedo and A. C. Hernandes, *J. Am. Ceram. Soc.* 85, 1870 (2002); Z. S. Macedo et al., *NIM B* 218, 153 (2003); T.-K. Tseng, University of Florida (2010); and D. E. Kozhbakhteeva and N. I. Leonyuk, *J. Optoelectronics and Adv. Materials* 5, 621 (2003). There are reports of the solid-state synthesis of the metal oxides that successfully generated nano-BGO:Eu. The two solution routes reported were of interest since they are a convenient method for production of large scale powders and have reportedly demonstrated control over the phase and morphology based on the choice of surfactants and solution pH. See S. Polosan et al., *Optoelectronics Adv. Mater.* 4, 1503 (2010). Both routes employ nitric acid (HNO$_3$) to minimize bismuth reduction following solvothermal (SOLVO) and solution precipitation (SPPT) methodologies. See D. E. Kozhbakhteeva and N. I. Leonyuk, *J. Optoelectronics and Adv. Materials* 5, 621 (2003); and T.-K. Tseng, University of Florida (2010). Therefore, both methods require the addition of HNO$_3$ and other reagents that can lead to trace impurities. The SOLVO route yields crystals up to 500 nm in size from a mixture of the metal oxides ($Bi_2O_3$ and $GeO_2$) that are slurried in aqueous ammonium fluoride (NH$_4$F) in the presence of HNO$_3$ and heated at 310° C. at 20-50 MPa. See D. E. Kozhbakhteeva and N. I. Leonyuk, *J. Optoelectronics and Adv. Materials* 5, 621 (2003). In contrast, the SPPT route involves the dissolution of GeO$_2$ and Bi(NO$_3$)$_3$ in HNO$_3$, dilution with urea and water, and heating the reaction mixture to 90° C., followed by the addition of sodium hydroxide. The initial (2 min) material isolated from this complex reaction mixture was found to be amorphous, but heating for 1 hour led to phase-pure BGO. After decanting and heating to 500° C. flower-like BOO crystals were isolated with a trace of the sillenite impurity reported. See T.-K. Tseng, University of Florida (2010).

However, a need remains for a simple method to synthesize phase-pure E-BGO powders following a solution route that does not require additional thermal treatment.

SUMMARY OF THE INVENTION

The present invention is directed to a simple, hydrothermal synthesis route to the eulytite phase of bismuth germanium oxide (E-BGO: $Bi_4(GeO_4)_3$) that requires no post-processing. In a preferred method, the E-BGO material is produced from a mixture of bismuth nitrate pentahydrate and a slight excess of $GeO_2$ in water that is reacted under hydrothermal conditions. The excess $GeO_2$ can be added to prevent sub-stoichiometric phases during synthesis. Phase-pure sub-millimeter sized particles can be formed in as little as 12 hours of processing at 185° C. Any residual $GeO_2$ can be easily removed by washing with water or from thermal treatment. While no post-processing is necessary, entrapped water and residual $GeO_2$ can be removed by thermal processing. The pure E-BGO is thermally stable, but a change in orientation can occur due to crystal growth. The E-BGO powder melts at 1034° C. Luminescence properties of the E-BGO are similar to single crystal excitation and emissions. In particular, photoluminescence spectra from the E-BGO materials exhibit a strong emission peak consistent with an X-ray induced luminescence of a single crystal (e.g., emission at 500 nm excited at 285 nm). The cathodoluminescence of the E-BGO displays a broad band spectrum with a maximum at 487 nm. The cathodoluminescent response is unexpectedly bright and falls relatively close to pure white light. Lanthanide dopants can be added to alter the emission and excitation maxima.

BRIEF DESCRIPTION OF THE DRAWINGS

The detailed description will refer to the following drawings, wherein like elements are referred to by like numbers.

FIG. 1(a) is a PXRD pattern of $Bi_4(GeO_4)_3$. FIG. 1(b) is a PXRD pattern of $Bi_4(GeO_4)_3$ isolated with $Bi_2O_2(OH)(NO_3)$ (indicated by the ♦ symbol). FIG. 1(c) is a PXRD pattern of $Bi_4(GeO_4)_3$ contaminated with $GeO_2$ (indicated by the ● symbol).

FIG. 2(a) is an optical image (scale bar: 500 μm). FIG. 2(b) is a scanning electron microscopy (SEM) image (scale bar: 2 mm). FIG. 2(c) is a SEM image (scale bar: 1 mm). FIG. 2(d) is a SEM image (scale bar: 500 μm). FIG. 2(e) is a SEM image (scale bar: 40 μm).

FIG. 3(a) is a photoluminescence spectrum. FIG. 3(b) is a catholuminescence spectrum. FIG. 3(c) is a plot of chromaticity of the emission (sample location indicated by the ● symbol). FIG. 3(d) is a radioluminescence spectrum induced by X-ray. FIG. 3(e) is a Tauc plot.

FIG. 6(a) is a SEM image of powder produced at a low precursor concentration.

FIG. 6(b) is a SEM image of powder produced at a standard precursor concentration. FIG. 6(c) is a SEM image of a powder produced at a high precursor concentration. FIG. 6(d) shows photoluminescence spectra for the low- and high-concentration powders.

DETAILED DESCRIPTION OF THE INVENTION

Figure 1:
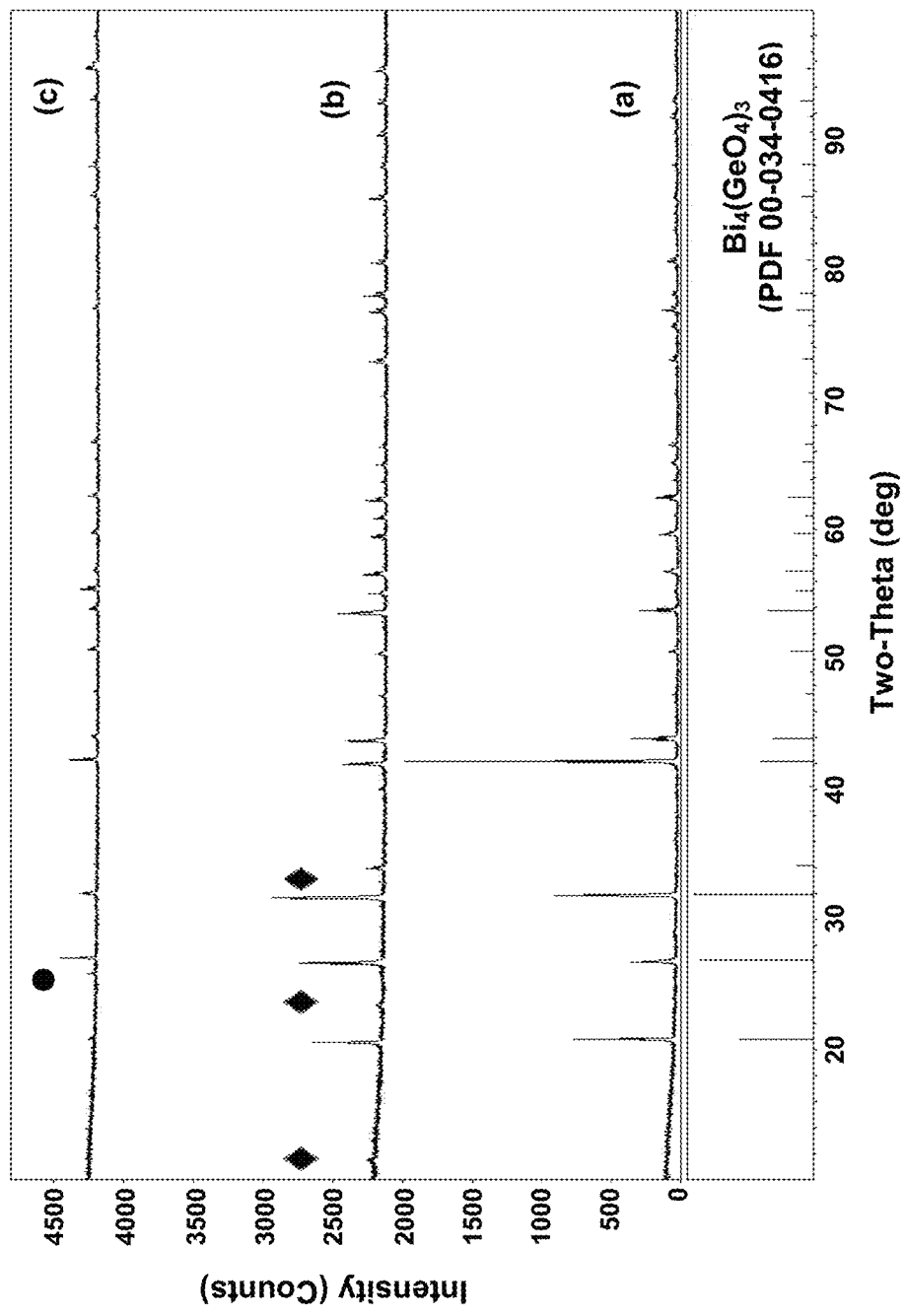
FIGS. 1(a)-(c) are powder XRD (PXRD) patterns of BGO produced by hydrothermal synthesis methods.

A method of the present invention for the hydrothermal synthesis of bismuth germanium oxide comprises dissolving a bismuth precursor and a germanium precursor in water and heating the aqueous solution to an elevated reaction temperature for a length of time sufficient to produce the eulytite phase of bismuth germanium oxide. In general, the bismuth and germanium precursors are soluble in water and stable to redox under hydrothermal conditions (i.e., the precursors will not decompose or be reduced to metal). For example, the bismuth precursor can be a bismuth nitrate or acetate. For example, the germanium precursor can be germanium dioxide. In general, the aqueous solution is preferably heated to a reaction temperature in the range of 150-200° C., although lower and higher temperatures can also be used.

An example of the present invention is shown in Eq. (1):

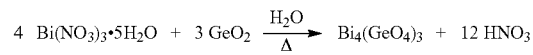

$$4\ Bi(NO_3)_3 \cdot 5H_2O\ +\ 3\ GeO_2\ \xrightarrow[\Delta]{H_2O}\ Bi_4(GeO_4)_3\ +\ 12\ HNO_3 \quad (1)$$

Bismuth nitrate pentahydrate ($Bi(NO_3)_3 \cdot 5H_2O$) is a preferred bismuth precursor, due to its high solubility in water. Likewise, germanium dioxide ($GeO_2$) is a preferred germanium precursor because it is air-stable and soluble in water. The addition of an excess of $GeO_2$ helps to minimize/eliminate non-innocent Bi by-products, and any residual $GeO_2$ can be easily removed by washing with water or by thermal treatment. The method builds on the work by Chen et al. where aurivillius ($Bi_2GeO_5$) nanorods were formed from a SOLVO mixture of $Bi(NO_3)_3 \cdot 5H_2O$ and $GeO_2$ dissolved in the presence of cetyltrimethyl ammonium bromide (CTAB) heated at 180° C. for 48 h, washed (water and ethanol) and dried at 80° C. for 6 h. See R. Chen et al., *Cryst. Growth Desgn.* 9, 1775 (2009). However, the work by Chen et al. was not aimed at the E-BGO scintillator materials (indeed, referring to E-BGO as an impurity). Described below are the synthesis, powder characterization, processing parameters, and subsequent luminescent properties of E-BGO materials from the simple SOLVO route employing only $Bi(NO_3)_3 \cdot 5H_2O$ and $GeO_2$.

E-BGO Synthesis

As an example of the invention, $Bi(NO_3)_3 \cdot 5H_2O$ (8.25 g, 17.0 mmol) was added to a TEFLON® liner of a 100 mL PARR® digestion bomb filled with ~75 mL of $H_2O$ (TEFLON is a registered trademark of E.I. du Pont de Nemours and Company for nonstick coating systems; PARR is a registered trademark of Parr Instrument Company for laboratory instruments and apparatus, including a variety of pressure vessels). $GeO_2$ (1.47 g, 14.0 mmol) was added to this mixture and another ~15 mL $H_2O$ of water were added, followed by gentle stirring. The bomb was then sealed and placed in an oven at 185° C. After heating for 24 h, the bomb was removed and allowed to cool to room temperature. The contents were centrifuged, the mother liquor decanted off, and the remaining powder washed 3 times with $H_2O$. The remaining white precipitate was dried under vacuum ($10^{-3}$ Torr) until a free flowing powder resulted. As described below, the resulting powder was identified as submicron-sized E-BGO. The method yielded 81.4% (4.31 g) of powder. The bulk materials isolated from the above synthesis were further characterized by powder X-ray diffraction (PXRD), scanning electron microscopy (SEM), transmission electron diffraction (TEM), density, photoluminescence (PL), cathodoluminescence (CL), and radioluminescence (RL) analyses, as described below.

E-BGO Powder Characterization

As shown in FIG. 1(a), the PXRD pattern of the powders generated according to the above hydrothermal synthesis method was found to be in good agreement with the E-BGO phase ($Bi_4Ge_3O_{12}$; PDF 00-034-0416). (PDF refers to Powder Diffraction File entry found in the PDF4+2013 database of powder diffraction patterns maintained by the International Centre for Diffraction Data (ICDD). While this process has been optimized to generate the eulytite material, several other products were also identified in earlier, less successful synthesis attempts, including $Bi_4(Ge_{2.87}O_{11.6})$ (PDF 01-074-9425), $Bi_{3.64}(Ge_3O_{11.4})$ (PDF 01-074-9426), $Bi_2Ge_3O_9$ (PDF 00-043-0216), $Bi_2(GeO_5)$ (PDF 00-036-0289). In addition, several contaminants were also noted for un-optimized syntheses including $Bi_6(O)_6(OH)_3(NO_3)_3 \cdot 1.5H_2O$ (PDF 00-053-1038), as shown in FIG. 1(b), and $GeO_2$ (PDF 04-010-4456), as shown in FIG. 1(c). See Z. S. Macedo and A. C. Hernandes, *J. Am. Ceram. Soc.* 85, 1870 (2002). The Bi contaminant can be removed by the addition of a 10% excess of $GeO_2$ starting materials and any residual $GeO_2$ can be easily removed with successive washes with water.

Figure 2:
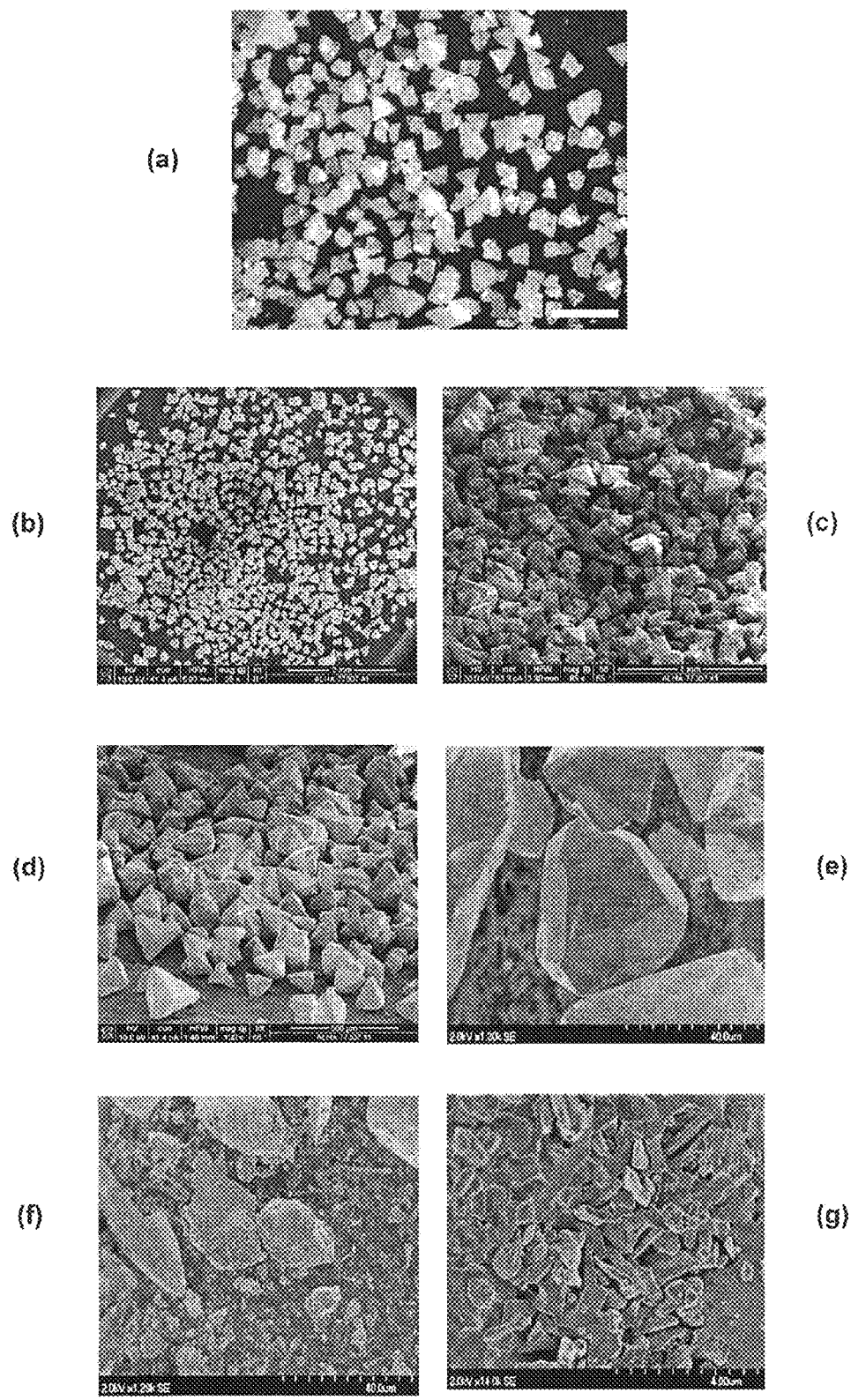
FIGS. 2(a)-(e) are images of the as synthesized SOLVO BGO (24 h at 185° C.).
FIG. 2(f) is a SEM image (scale bar: 40 μm).
FIG. 2(g) is a SEM image (scale bar: 4 μm).

As shown in FIG. 2(a), optical images of the optimized E-BGO samples revealed a shinny, crystalline material that appears to consist of tetrahedral shaped particles. As shown in FIGS. 2(b)-(g), SEM analysis revealed similar shaped grains approaching 40 μm in size. The surface of the particles was observed to be fairly smooth and appears quite faceted. As the magnification was increased, some smaller particles were observed on the surface of some of the samples, which appear as parallelepiped and irregular shaped plates. In addition, smaller irregular shaped particles were noted in the background.

The phase-pure material necessary to generate a high quality single crystal should possess both high optical quality and high density to minimize light scatter due to porosity and refractive index mismatch at the interface of the second phase. The E-BGO powders synthesized according to the present invention can be used as seed materials, since they are phase pure. Other methods often produce materials that suffer from mixed phases or lower densities (even after high temperature annealing). See I. I. Novoselov et al., *Inorganic Materials* 49, 412 (2013). In addition, the density of the BGO powder was measured at room temperature using a He pycnometer and found to be 6.982(3). This is equivalent to 98.18% of the theoretical density of 7.112 g/cm$^3$ determined by X-ray density for a single crystal.

Figure 3A:
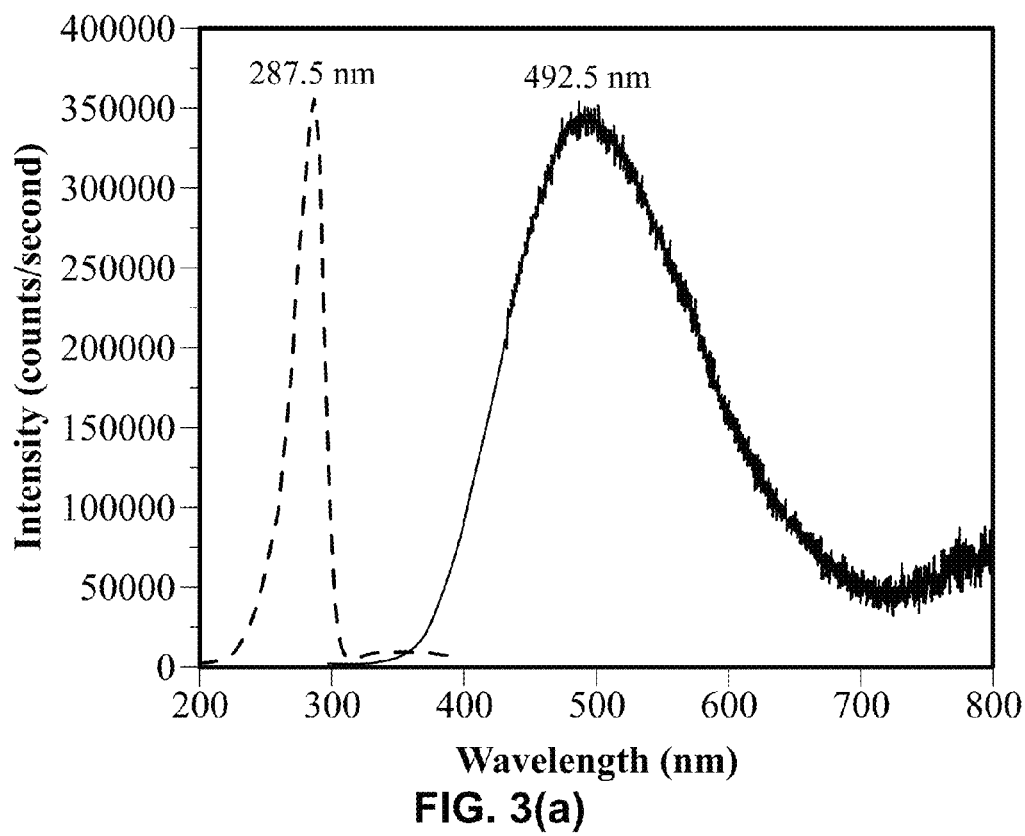
FIGS. 3(a)-(e) show the luminescent behavior of low-concentration E-BGO powders.

The luminescence properties of the bulk E-BGO powders were measured to verify their utility as a scintillator. As shown in FIG. 3(a), excitation (Ex) and emission (Em) peaks were observed at 287.5 and 492.5 nm, respectively. These photoluminescence spectra are consistent with the literature reports. See W. M. Yen et al., *Phosphor Handbook*, 2nd ed.; CRC Press, Taylor & Francis Group: Boca Raton (2007); C. W. E. van Eijk, *Nucl. Instr. Method. Phys. Res. A* 460, 1 (2001); T.-K. Tseng, University of Florida (2010); and O. M. Bordun, *J. Appl. Spectr.* 63, 97 (1996). The initial hydrothermal E-BGO powders were also pressed into pellets (¼ in ×6 mm, 16K psi) prior to additional thermal treatments. Pressing of the E-BGO did not alter the phase as determined by PXRD. Using a handheld UV lamp with an excitation source of 254 nm, the pellets were found to emit a greenish luminescence at room temperature. These pellets were used for all subsequent luminescent analyses.

Figure 3B:
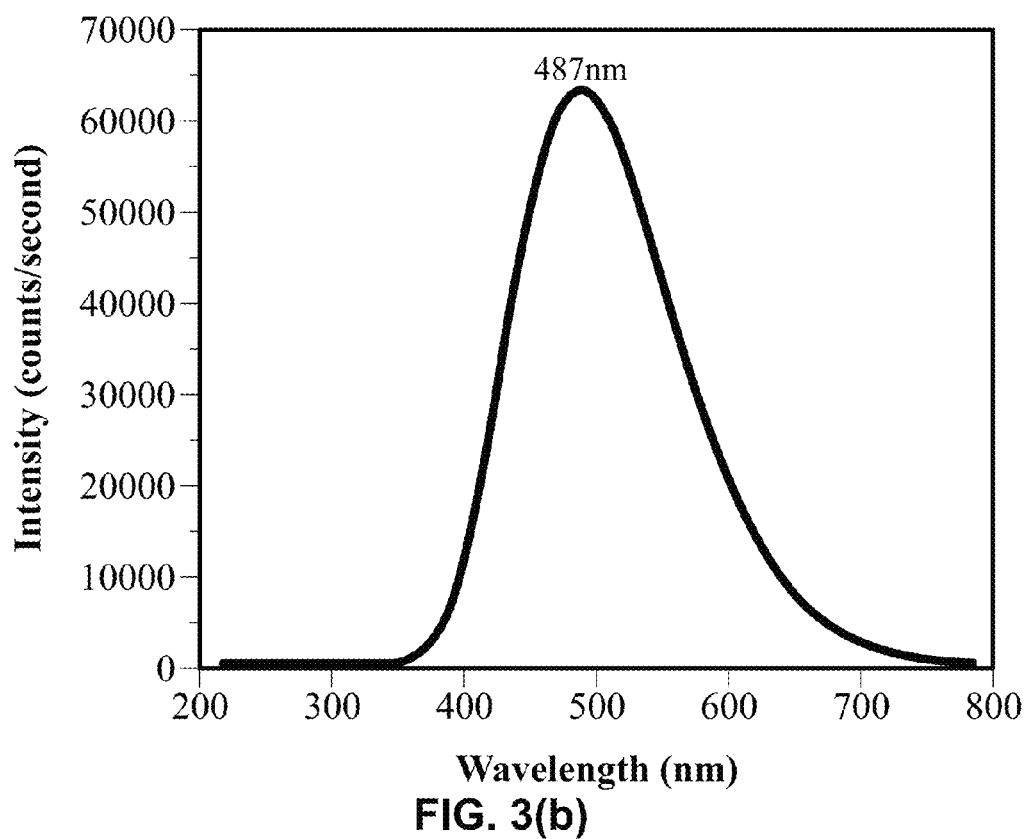
Figure 3C:
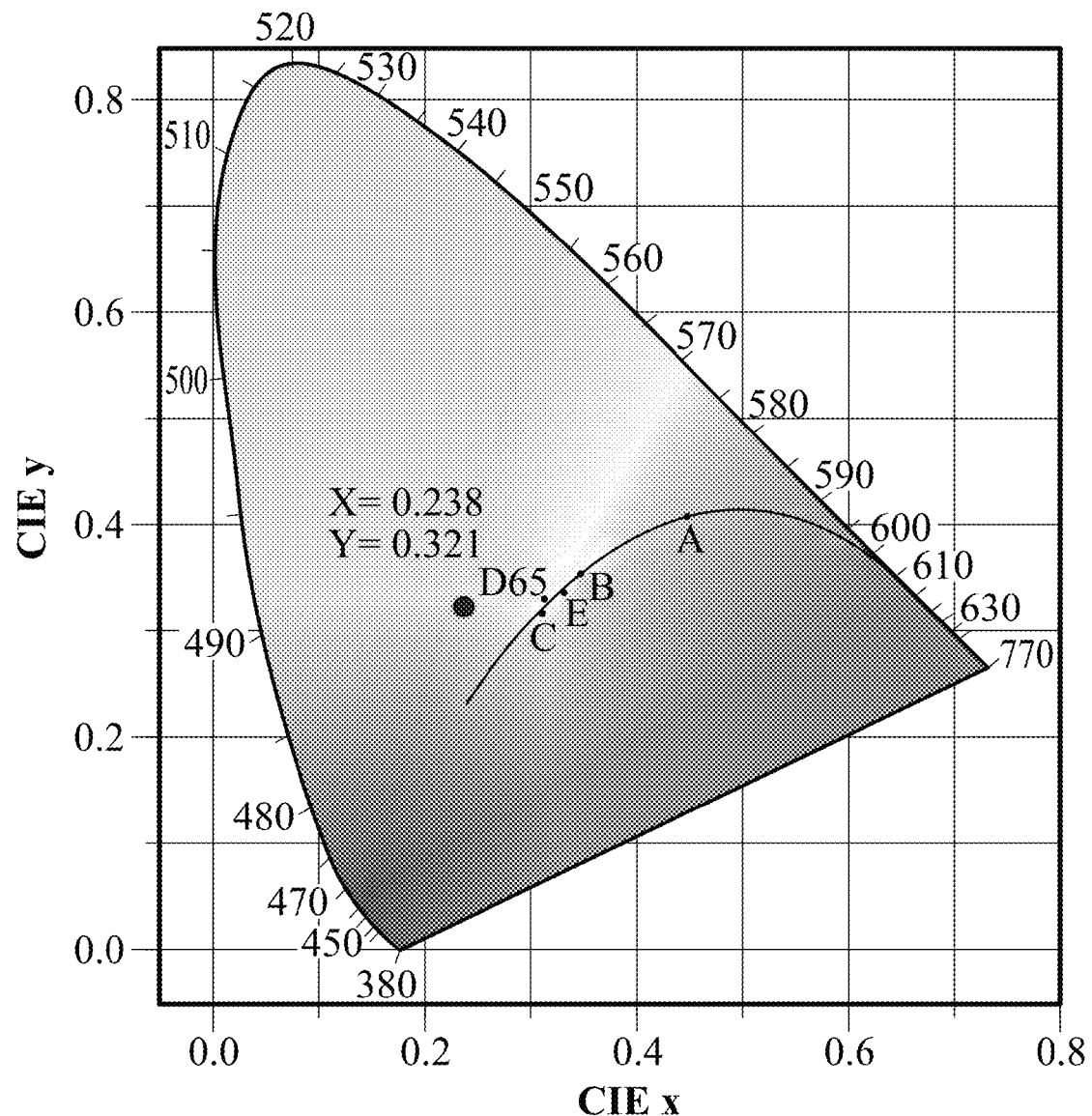
Figure 3D:
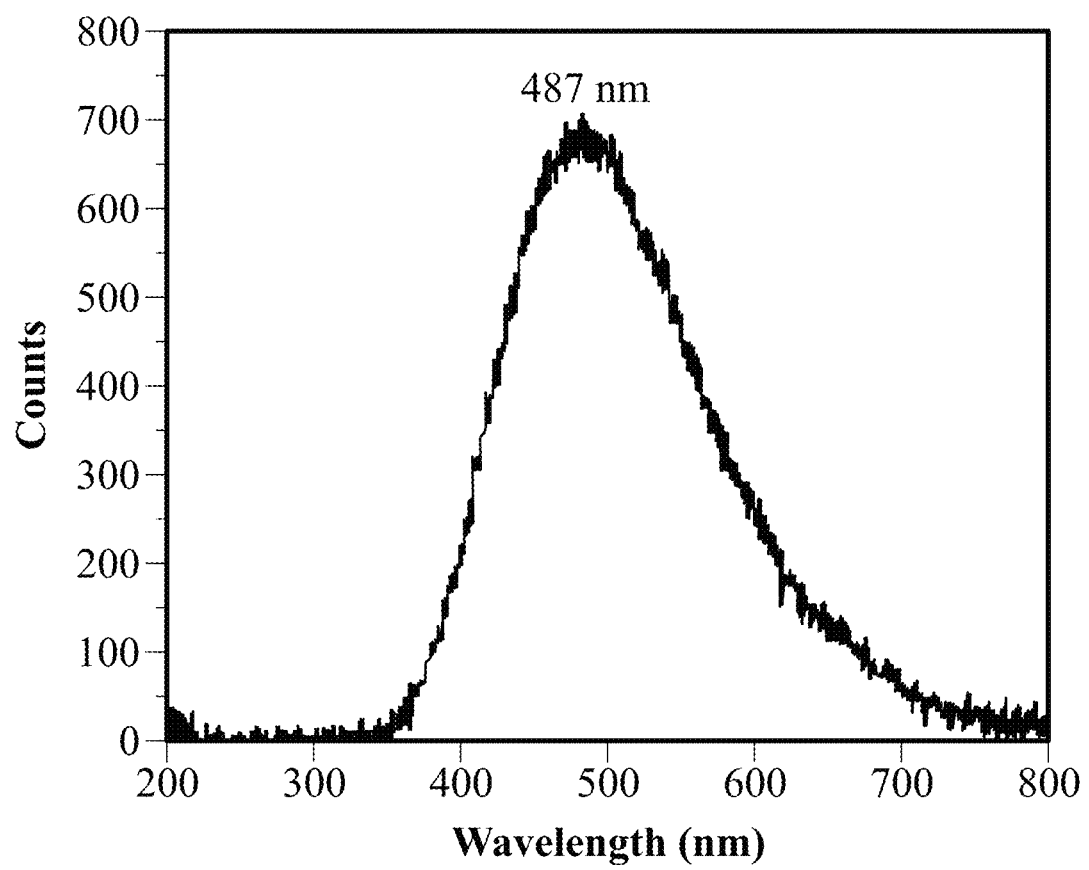

The catholuminescence response for the E-BGO crystals prepared by a low concentration route as shown in FIG. 3(b). The spectroscopic emission for these crystals is similar to their PL response, with a broad-band emission with its maximum at 487 nm. These results indicate that the E-BGO can be effective for both detection of photonic and ionization excitation sources. Therefore, this material can be used for phosphor, electroluminescence, X-ray imaging, and scintillation detection applications. FIG. 3(c) shows a chromaticity emission spectrum with the dark circle indicating where this E-BGO sample falls in this spectrum. The overall emission color was calculated according to International Commission on Illumination (CIE) color space with color coordinates of 0.238(x)/0.321(y), which is a slightly bluish white. This broad emission comes from a single phase sample, not a combination of three phosphors as it is commonly used in solid-state lighting applications. To move closer to standard D65 daylight (with coordinates of 0.3129(x)/0.3292(y), an effective red-shift dopant, such as a lanthanide (e.g., $Eu^{3+}$), can be added to render a better white-light emitting characteristic. The radioluminescence induced by the X-ray excitation is consistent with the CL response, as both of these sources produce ionization luminescence; however, the RL response confirms the potential of this material for medical applications. See N. Katoh et al., *Int. J. Radiat. Oncol. Biol. Phys.* 82, e671 (2012).

The band gap of the E-BGO powders was determined using a Tauc plot to reveal the optical absorption spectrum of a material. In a Tauc plot, a single phase material will have a distinct absorption onset as defined by a nearly linear region in the plot that yields the energy of the optical band gap of the sample. The diffuse reflectance spectrum was converted to a Kubelka-Munk function (F(R)) which is proportional to the absorption coefficient (α). F(R) was then substituted into Tauc Eq. (2) where $E_g$ is the optical band gap and hυ is the photon energy. Fitting routines were performed by plotting $(h\upsilon F(R))^{1/n}$ versus hυ for the BGO powder, where the intersection of the uprising curve to the horizontal axis is the estimated $E_g$ (optical band gap). See J. Tauc et al., *Physica Status Solidi* 15, 627 (1996).

$$(h\upsilon\alpha)^{1/n}=A(h\upsilon-E_g) \sim (h\upsilon F(R))^{1/n} \qquad (2)$$

Figure 3E:
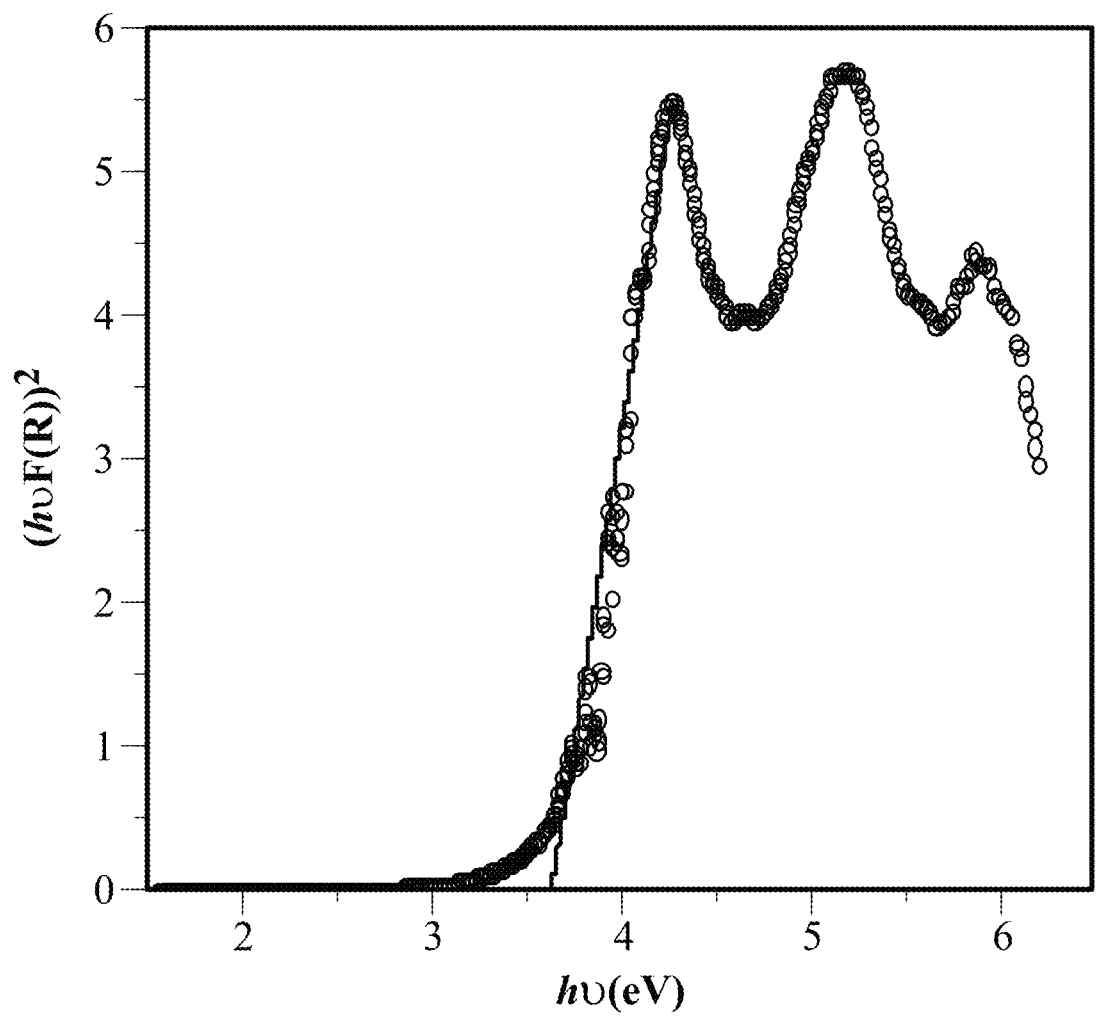

From the plot shown in FIG. 3(e) and using the Kubelka-Munk function and Tauc Eq. (2), the estimated band gap is ~3.64 eV. This is in agreement with the reported literature value of ~3.6 eV. See S. Polosan et al., *Solid State Science* 13, 49 (2011). The exponent n=2 derived from the Tauc plot suggests the transition is an indirect allowed transition. Therefore, the bandgap of the powders generated according to the present invention are in good agreement with other high quality single crystal materials. Since the estimated band gap is 3.64 eV (~361 nm), it is not surprising that all of the emission spectra are the same, regardless of whether the emission was induced by photoexcitation (287.5 nm or 4.31 eV), CL (>4-20 eV), or X-ray (~8 eV), as these excitations all exceeded the band gap and therefore produced the same host excitation.

Thermal Stability of E-BGO Powders

Figure 4:
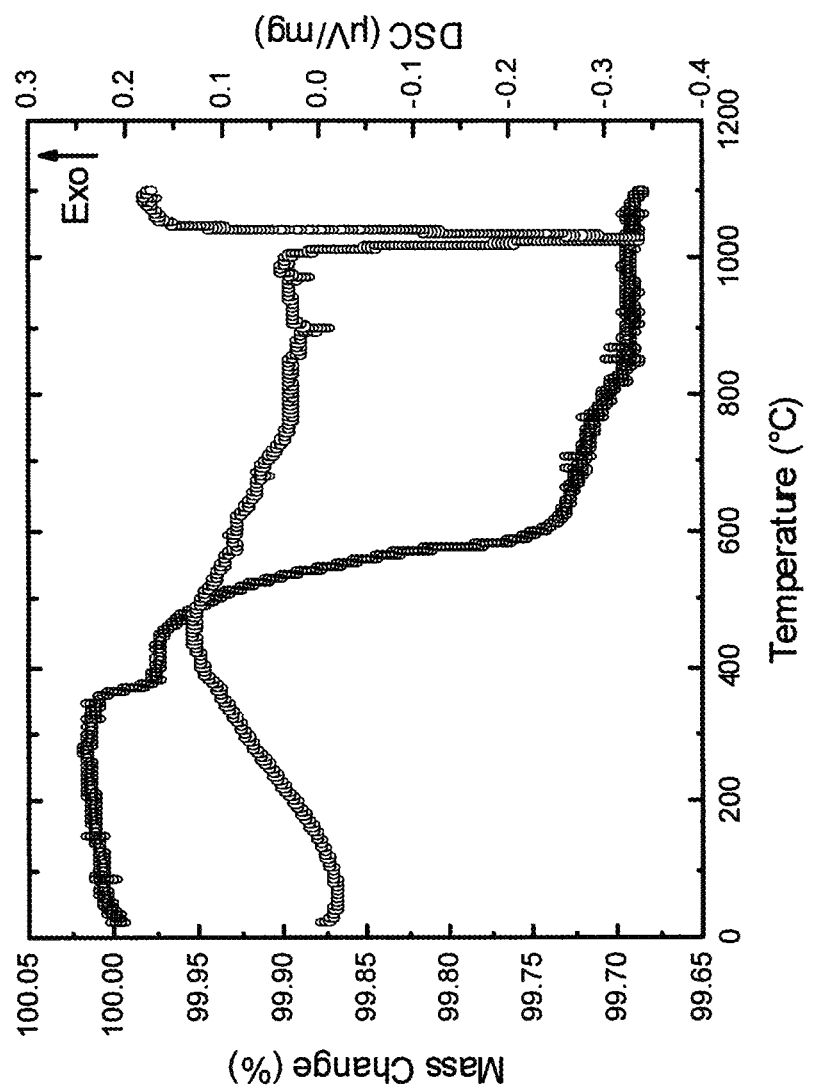
FIG. 4 shows thermogravimetric analysis (TGA) and differential scanning calorimetry (DSC) plots for an initial hydrothermal BGO powder.

The thermal stability of the E-BGO powders was studied to determine if it is adequate for higher temperature processing that may be necessary for specific applications. Initially, a thermogravimetric analysis (TGA) spectrum was obtained to determine if any melts, crystallization, or decomposition pathways could be elucidated. FIG. 4 shows first pass TGA and differential scanning calorimetry (DSC) plots of a sample. From all samples studied, a two-step weight loss of average 0.75% was noted. The first weight loss was attributed to entrapped water, while the second step was attributed to the loss of $GeO_2$. Up to 1000° C., there were no additional weight losses or thermal events recorded, indicating the stability of the E-BGO powder. An endotherm was noted in the DSC at 1034° C., which is consistent with the literature report for the bulk E-BGO melting point of 1049.85° C. A sample that was heat treated to 950° C. followed by cooling and reheating demonstrated no additional weight loss, but the same melting point. This indicates that any trace impurities can be removed by a low temperature heat process and that the E-BGO material is relatively stable up to its melting point.

Figure 5A:
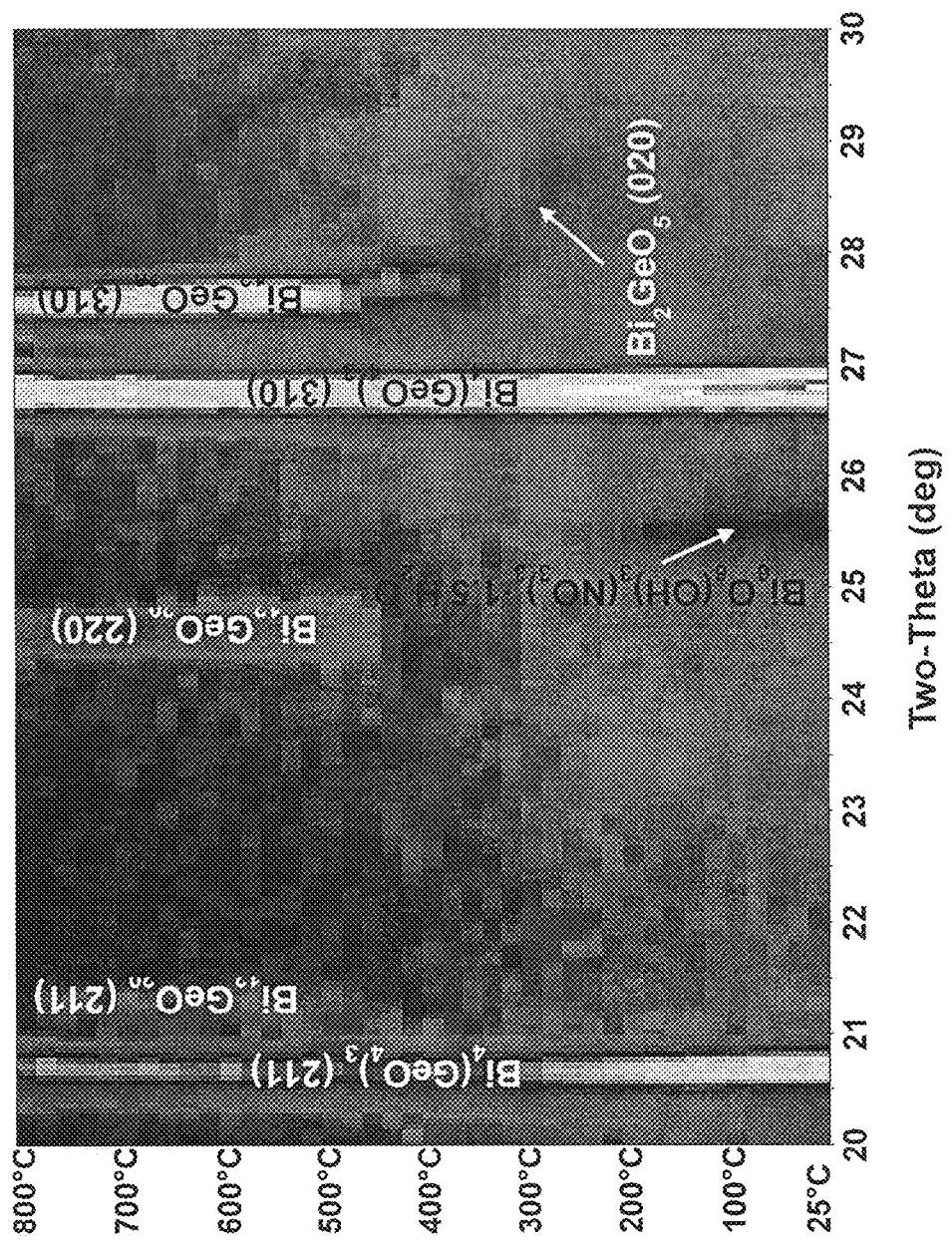
FIG. 5(a) is a VT-PXRD scan of an original, contaminated E-BGO powder.

In some instances, thermal processing of the powders led to increased phase separation of what was originally relatively pure material. VT-PXRD experiments were undertaken to explain this phenomenon while elucidating the various phase changes that occurred during thermal processing. Two samples were analyzed: an initial sample from unoptimized E-BGO and an optimized E-BGO. FIG. 5(a) is a VT-PXRD scan of an unoptimized "green" E-BGO powder with Bi-containing contaminants. The initial sample investigated revealed a PXRD pattern that was E-BGO with the presence of a bismuth oxide nitrate hydroxide hydrate $(Bi_6(O)_6(OH)_3(NO_3)_3 \cdot 1.5H_2O$; PDF 00-053-1038) and bismuth oxide nitrate hydroxide $(Bi_3(NO_3)_3(O)_2$; PDF 04-013-4109) contaminant. These impurities are not unexpected with the stoichiometric synthesis originally used and the fact that these phases can be prepared hydrothermally at 190° C. for 24 hours from "$Bi(NO_3)_3 \cdot 5 H_2O$" and "$H_2O$". See N. Henry et al., *Naturforsch.* 60b, 322 (2005). Two different atmospheres (air or $N_2$) were employed to determine how they would impact phase formation during the heat treatment cycle. For both samples, the major E-BGO component could be observed throughout the heat treatment, but the behavior of the sample's impurities revealed some interesting changes. Careful evaluation of the VT-PXRD scans revealed changes occur as the room temperature sample was heated (under flowing UHP $N_2$). The $Bi_6(O)_6(OH)_3(NO_3)_3 \cdot 1.5H_2O$ phase decomposes at about 220° C. This is quickly followed by the formation of a nano-grained (broad peak) unidentified by-product, which is thought to be a high-Bi containing intermediate (i.e., aurivillius: PDF 04-011-0087). The presence of excess Bi as a result of the decomposition of the $(Bi_6(O)_6(OH)_3(NO_3)_3 \cdot 1.5H_2O$ appears to drive a reaction of this Bi-rich phase with the eulytite phase. This results in the degradation of the E-BGO fraction and the growth of a Bi-rich sillenite phase. The same sample heated under an air atmosphere showed nearly identical behavior. Therefore, alternative syntheses were necessary to optimize the E-BGO route and minimize Bi contaminant. This was accomplished using excess $GeO_2$.

Figure 5B:
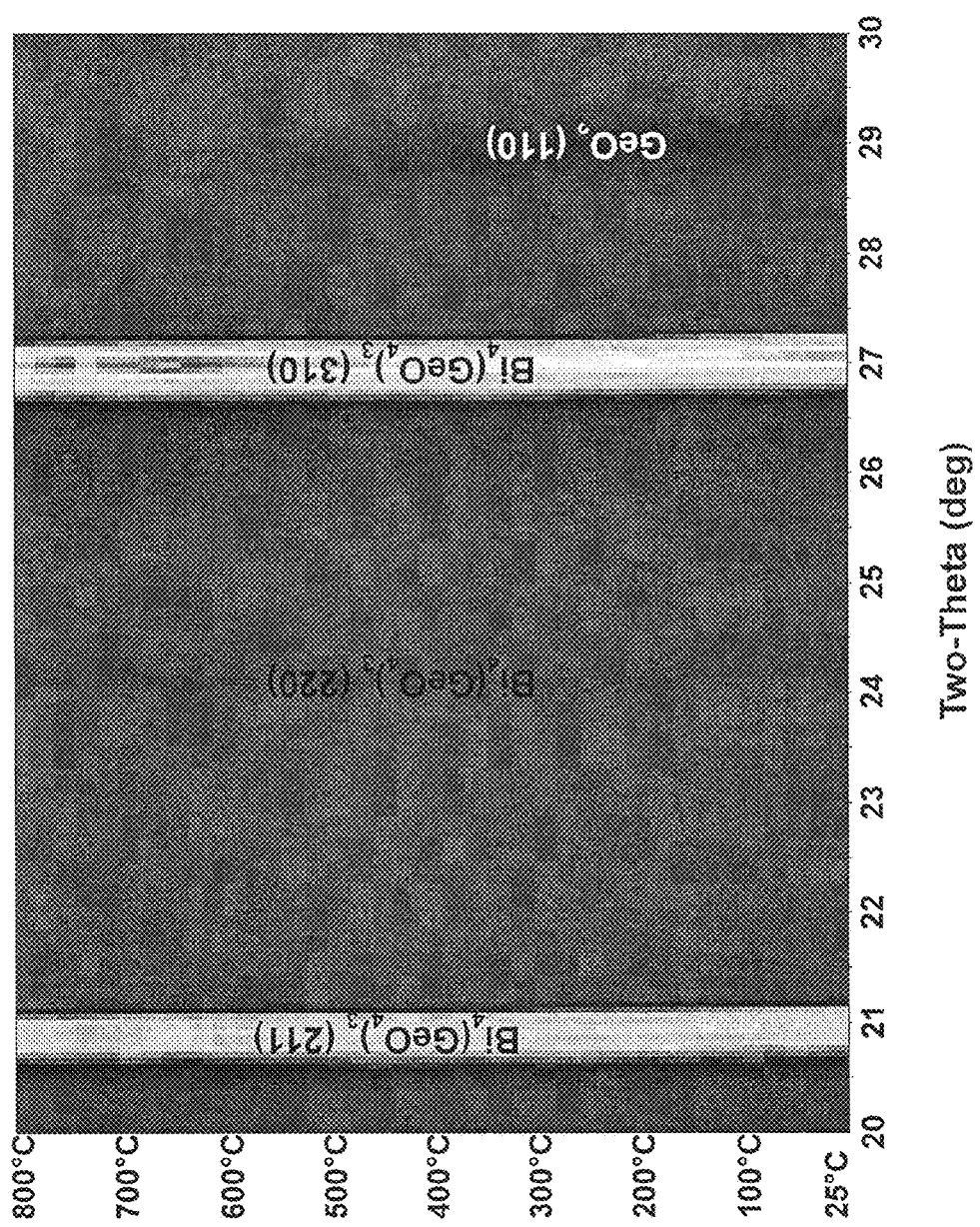
FIG. 5(b) is a VT-PXRD scan of optimized E-BGO powder.

FIG. 5(b) is a VT-PXRD scan of an optimized E-BGO sample that was heated in UHP $N_2$ (ramp rate 20° C./min to 800° C.) and monitored via XRD. The initial scan shows the typical diffraction pattern for E-BGO. A very minor second phase was detected in the initial XRD pattern prior to heating, which disappears upon heating to 540° C. The impurity is likely a germanium species, most likely $GeO_2$ (argutite; PDF 00-035-0729). In order for this identification to be valid, significant adjustment of the $GeO_2$ unit cell must be made. The loss of the minor phase is either due to the oxide's volatility, glassy phase forming, or consumption by the E-BGO. See R. B. Bernstein and D. J. Cubicciotti, *Am. Chem. Soc.* 73, 4112 (1951); and X. Jiang et al., *J. Laser Phys.* 23, 105812 (2013). Definitive elucidation of this or other pathways has not been determined, but the presence of this small impurity does not appear to detrimentally impact the $Bi_4(GeO_4)_3$. These results are consistent with the temperatures noted for the weight losses in the TGA. Lattice parameter refinement of the E-BGO before and after heat treatment were identical within the error of the refinement resulting in values of a=10.505(3) Å (before) and a=10.502 (3) Å (after).

The thermal data suggests that the E-BGO material is stable over the temperature range investigated. Samples of the optimized E-BGO powder were fired at 125, 450 and 650° C. under circumjacent atmospheres and the resulting PXRD patterns demonstrated E-BGO was isolated. However, there were some distinct changes in the orientation of powder noted during the processing. In particular, the 450° C. samples showed the most prominent changes probably due to the loss of both $H_2O$ and $GeO_2$ and subsequent recrystallization. The density of the 650° C. treated material was also analyzed by He pyncometry analysis and was found to be 6.978(3) g/cc, which is equivalent to a 98.12% of the theoretical density of 7.112 g/cc determined by X-ray density for a single crystal. The consistency of the density of the E-BGO from room temperature to high temperature processing further indicates the stability and quality of the as synthesized E-BGO.

Effects of Reaction Precursor Concentrations

Figure 6:
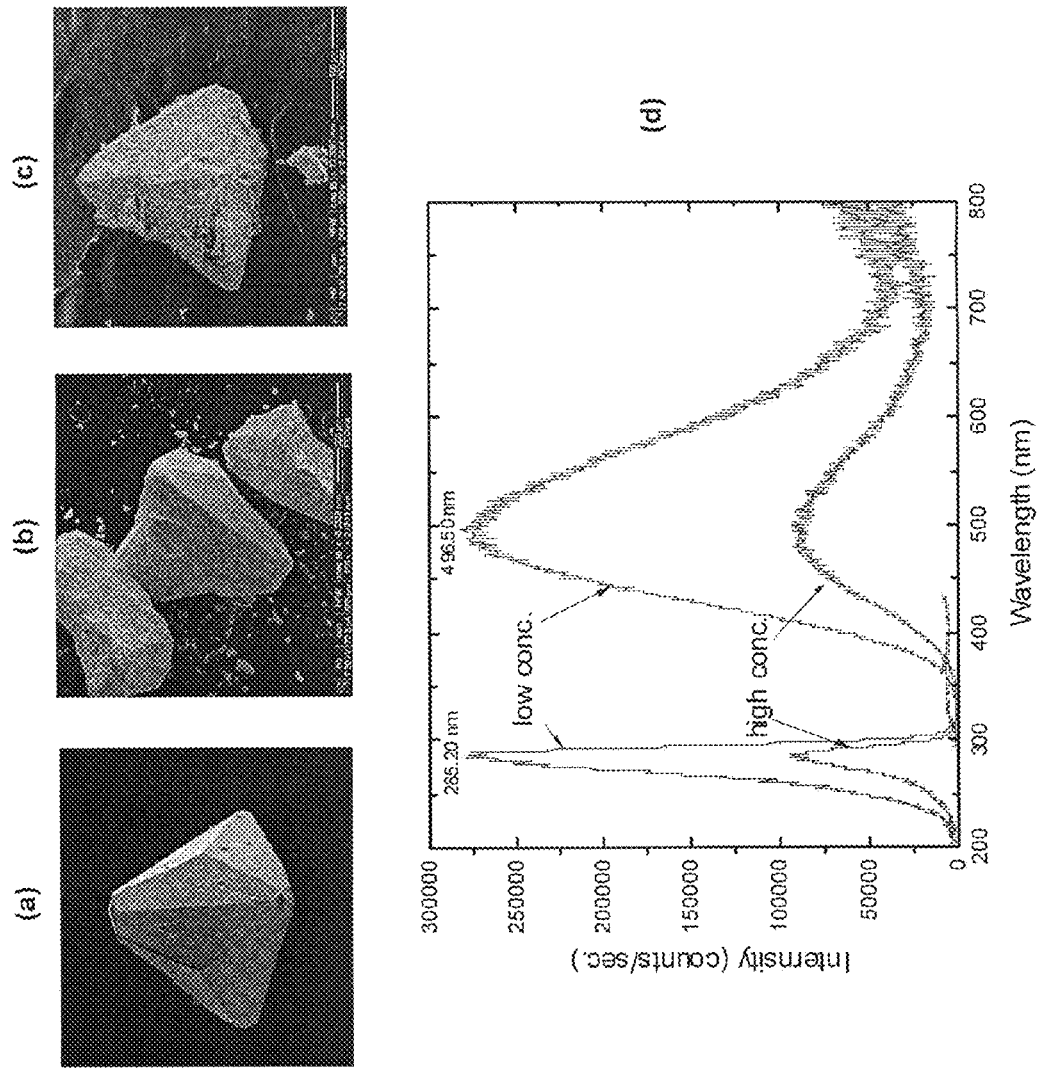
FIGS. 6(a)-(d) show the effect of precursor concentration on particles size.

Samples were prepared using different processing parameters to determine the concentration of the optimized reaction mixture. The samples were synthesized as described above, but with different amounts of precursor materials. Three samples were run: (a) low concentration (½ the amount of precursors), (b) standard concentration (i.e., 0.18 M bismuth nitrate pentahydrate and 0.15 M germanium dioxide), and (c) high concentration (2 times the amount of precursor). The resulting powders were analyzed by PXRD and all proved to be phase-pure E-BGO. As shown in FIGS. 6(a)-(c), SEM images of the powders were collected to investigate any potential variations in morphology. The powders all appear similar in size and shape; however, as the concentration is increased, smaller fragments can be observed on the particle surface. The different sample preparations did not significantly alter the spectroscopic response of BGO. That is, the locations of the excitation (Ex) and emission (Em) maxima were approximately the same for each sample investigated (small shifts due to selected local maxima were noted) and consistent with the literature reports of bulk E-BGO. See W. M. Yen et al., *Phosphor Handbook*, 2$^{nd}$ ed.; CRC Press, Taylor & Francis Group: Boca Raton (2007); C. W. E. van Eijk, *Nucl. Instr. Method. Phys. Res. A* 460, 1 (2001); T.-K. Tseng, University of Florida (2010); and O. M. Bordun, *J. Appl. Spectr.* 63, 97 (1996). However, a significant impact on light output was noted between these samples. The BOO sample prepared by low concentration had well-developed facet surfaces and a higher light output. The standard concentration performed similar to the low; whereas the high concentration suffered a decrease in performance. FIG. 6(d) shows the excitation and emission peaks of the high and the low concentration samples. The observation suggests that there may be a correlation between the perfection of crystallinity and the luminosity in sample preparation. The medium concentration provided the optimized process, in that it yields relatively high light output while maintaining a large enough quantity of material to be useful for practical applications. However, the molar concentrations can generally be between about ½ and 3× the standard amount, preferably with a slight excess of the germanium precursor.

Effect of Reaction Time

Figure 7A:
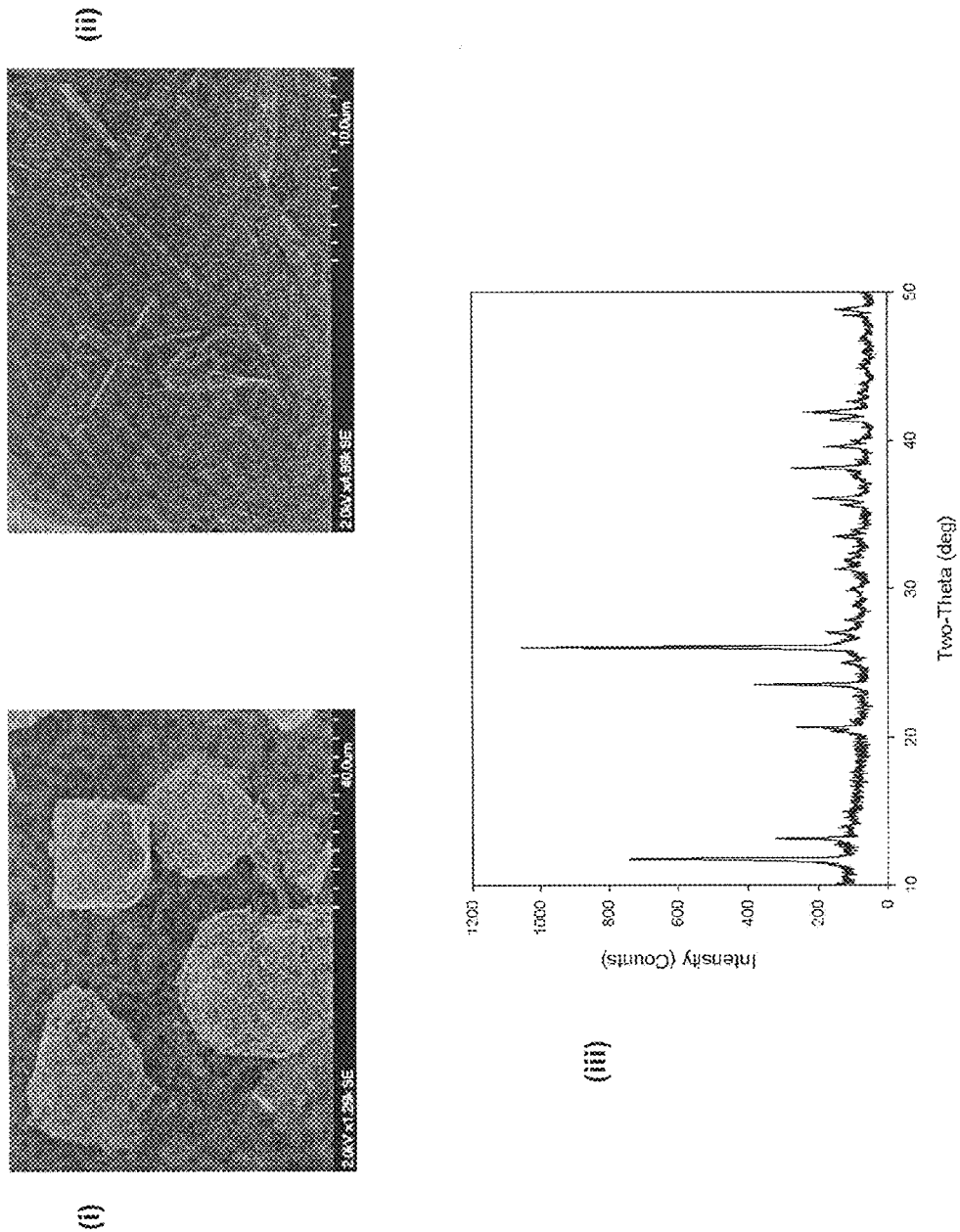
FIGS. 7(a)-(e) show SEM images (i)-(ii) and PXRD patterns (iii) for E-BGO samples heated at 185° C. under SOLVO conditions for (a) 1 hr (scale bars: 40 μm(i) and 10 μm (ii)), (b) 2 hr (scale bars: 40 μm (i) and 5 μm (ii)), (c) 6 hr (scale bars: 40 μm (i) and 20 μm (ii)), (d) 12 hr (scale bars: 40 μm (i) and 40 μm (ii)), and (e) 8 weeks (scale bars: 40 μm (i) and 20 μm (ii)).
Figure 7B:
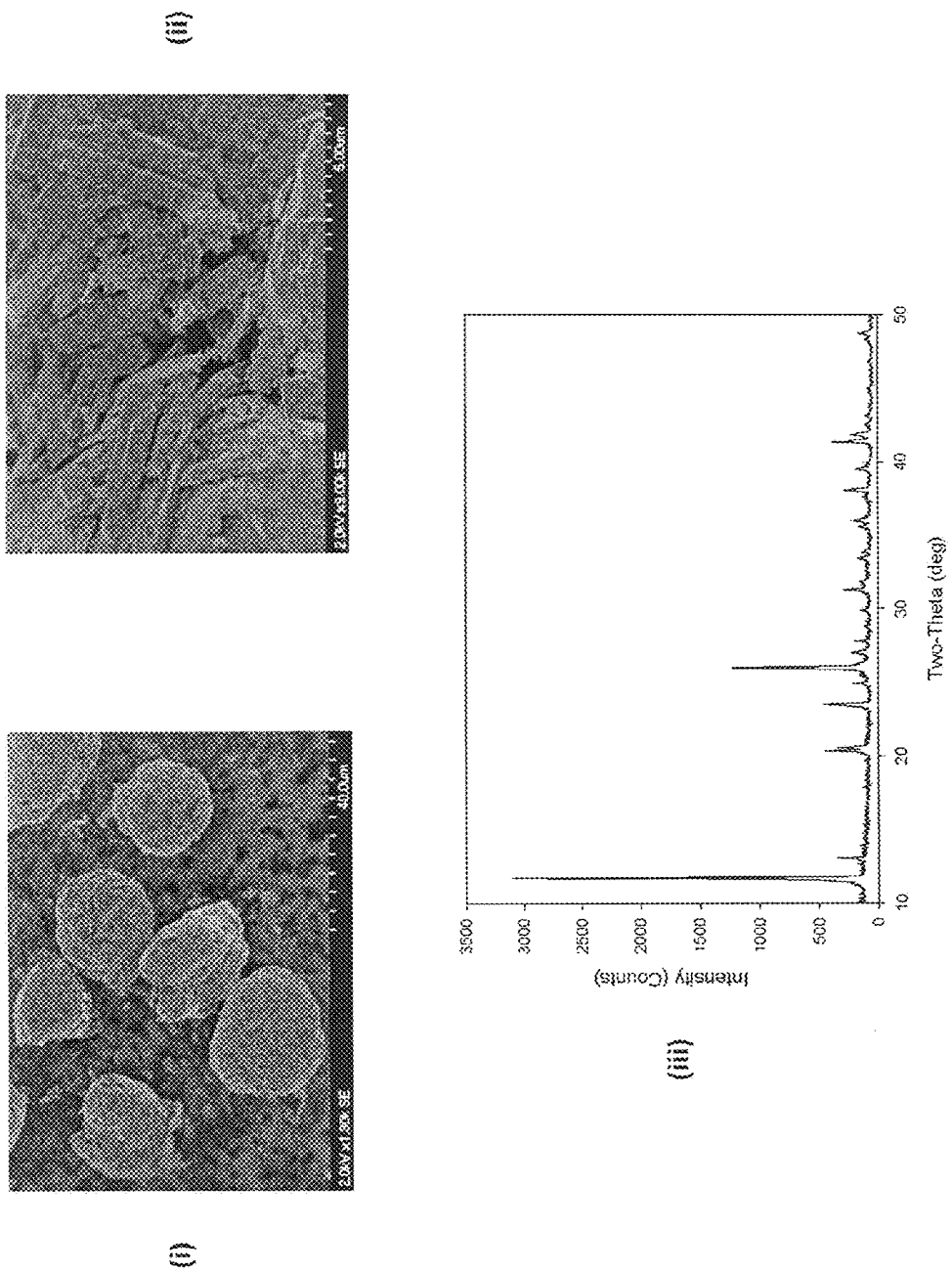
Figure 7C:
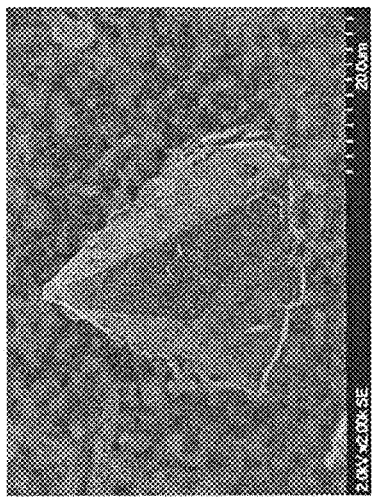
Figure 7C:
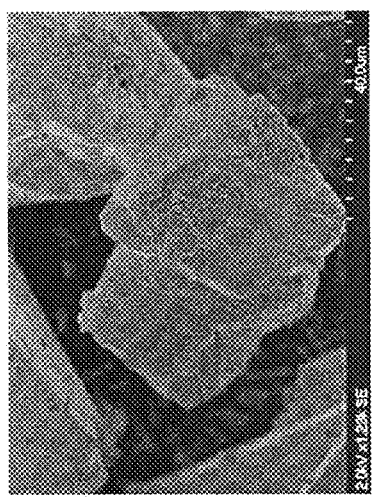
Figure 7C:
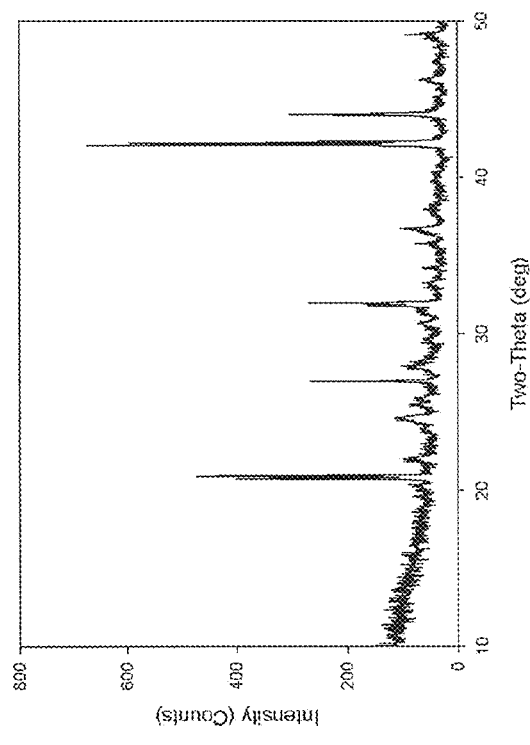
Figure 7D:
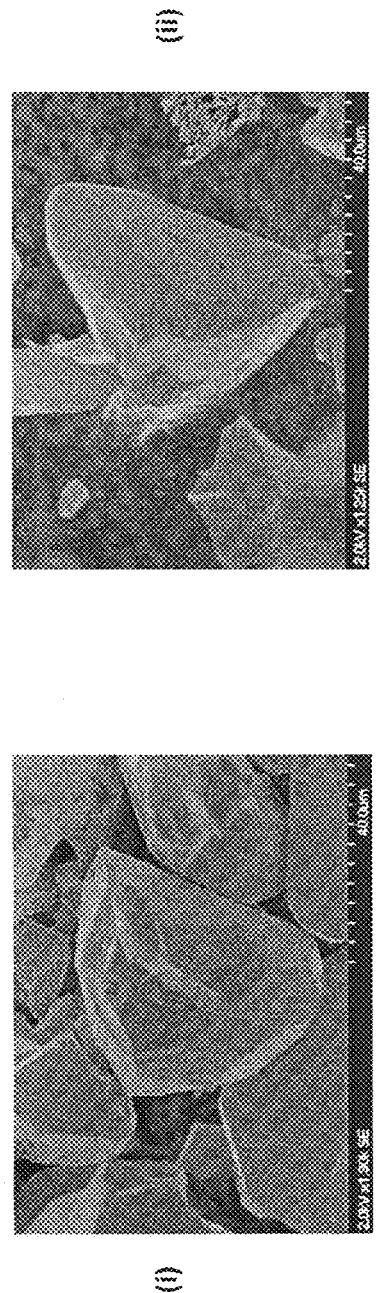
Figure 7D:
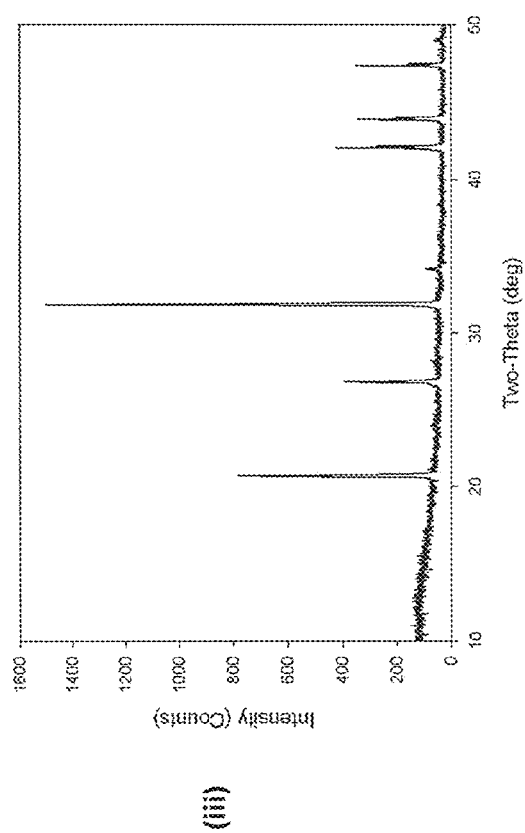
Figure 7E:
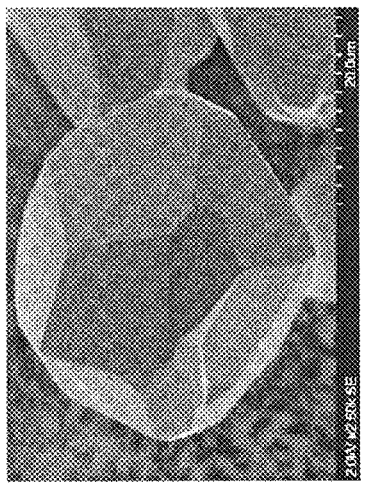
Figure 7E:
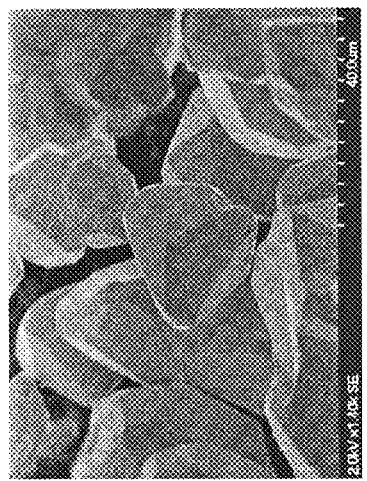
Figure 7E:
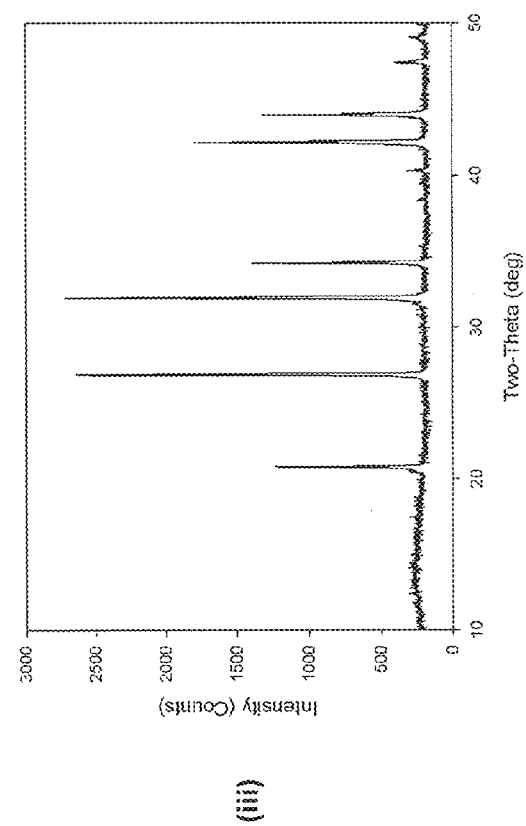

A temporal study concerning the crystallite size of the E-BGO was undertaken to determine the optimal heating time at a temperature of 185° C. and to determine if larger particles can be generated. Samples were collected at 1, 2, 6, 12 hours of heating (FIGS. 7(a)-(d), respectively) as well as at 1, 2, 4, and 8 weeks (FIG. 7(e)). As shown by the PXRD pattern in FIG. 7(a)(iii), the $Bi_6(O)_6(OH)_3(NO_3)_3 \cdot 1.5H_2O$ phase had already formed after 1 hour of heating at 185° C. This phase was maintained through the 2 hour sample but by 6 hours, the E-BGO had clearly formed, with some minor unidentified phases present. At 12 hours, all of the material had converted to the E-BGO (PDF 00-034-0416) and all additional samples (1, 2, 3, and 8 weeks) were identified as phase pure E-BGO. SEM images for the 1 and 2 hour samples show that the $Bi_6(O)_{63}(NO_3)_3 \cdot 1.5H_2O$ material consist of 10-20 μm spheres comprising smaller rod-like crystals (FIGS. 7(a),(b)—(i),(ii)). By 6 hours (FIGS. 7(c)—(i),(ii)), the smoother E-BGO crystals had formed and were about 40 μm in size. After 12 hours (FIGS. 7(d)—(i),(ii)) and over the next 8 weeks (FIGS. 7(e)—(i),(ii)), the samples did not appear to grow significantly larger in size, but did appear smoother and more faceted. Therefore, samples of pure E-BGO can be obtained in as little as 12 hours at 185° C., although larger seeds did not grow.

The present invention has been described as a method for the hydrothermal synthesis of bismuth germanium oxide. It will be understood that the above description is merely illustrative of the applications of the principles of the present invention, the scope of which is to be determined by the claims viewed in light of the specification. Other variants and modifications of the invention will be apparent to those of skill in the art.

I claim:

1. A method for the hydrothermal synthesis of bismuth germanium oxide, comprising;
   dissolving a bismuth precursor and a germanium precursor in water to provide an aqueous solution, and
   heating the aqueous solution in a sealed digestion bomb to a reaction temperature in the range of 150 to 200° C. for a length of time sufficient to produce an eulytite phase of bismuth germanium oxide.

2. The method of claim 1, wherein the bismuth precursor comprises bismuth nitrate or bismuth acetate.

3. The method of claim 2, wherein the bismuth nitrate comprises bismuth nitrate pentahydrate.

4. The method of claim 1, wherein the germanium precursor comprises germanium dioxide.

5. The method of claim 1, wherein an amount of germanium precursor in excess of the stoichiometric amount is dissolved in the aqueous solution.

6. The method of claim 5, wherein the excess germanium precursor is removed from the bismuth germanium oxide produced by washing with water or by thermal treatment.

7. The method of claim 1, wherein the reaction temperature is about 185° C.

8. The method of claim 7, wherein the aqueous solution is heated to about 185° C. for a length of time greater than 12 hours.

9. The method of claim 1, wherein the eulytite phase of bismuth germanium oxide is produced with a yield of greater than about 80%.

10. The method of claim 1, further comprising thermal processing the bismuth germanium oxide produced to a temperature greater than 200° C. to remove trace impurities.

11. The method of claim 3, wherein the concentration of bismuth nitrate pentahydrate in the aqueous solution is between 0.1 and 0.6 molar.

12. The method of claim 4, wherein the concentration of germanium dioxide in the aqueous solution is between 0.1 and 0.5 molar.

13. The method of claim 1, further comprising dissolving a dopant in the aqueous solution to shift the optical emission of the bismuth germanium oxide produced.

14. The method of claim 13, wherein the dopant comprises a lanthanide dopant.

15. The method of claim 14, wherein the lanthanide dopant comprises $Er^{3+}$.

* * * * *